(12) United States Patent
Kaneko et al.

(10) Patent No.: US 6,330,495 B1
(45) Date of Patent: Dec. 11, 2001

(54) OFF-LINE TEACHING METHOD AND APPARATUS FOR THE SAME

(75) Inventors: Masakatsu Kaneko, Hanno; Shinji Aoki, Sayama, both of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,233

(22) Filed: Sep. 28, 1998

(30) Foreign Application Priority Data

Oct. 27, 1997 (JP) .................................................. 9-294415

(51) Int. Cl.⁷ .................................................. G05B 15/00
(52) U.S. Cl. .................................................. 700/264; 700/248
(58) Field of Search .................................................. 700/245, 248, 700/250, 264; 318/568.1, 568.11; 345/326, 335

(56) References Cited

U.S. PATENT DOCUMENTS

| | | | |
|---|---|---|---|
| 4,379,335 | * | 4/1983 | Kirsch .................................. 700/264 |
| 4,451,895 | * | 5/1984 | Sliwkowski ......................... 345/326 |
| 4,455,619 | * | 6/1984 | Masui .................................. 345/509 |
| 4,538,225 | * | 8/1985 | Banks .................................. 707/530 |
| 4,656,582 | * | 4/1987 | Chaitin ................................... 717/7 |
| 4,656,603 | * | 4/1987 | Dunn .................................. 345/348 |
| 4,667,290 | * | 5/1987 | Goss ........................................ 717/7 |
| 4,731,609 | * | 3/1988 | Reynolds ............................. 345/146 |
| 4,831,548 | * | 5/1989 | Matoba ............................... 700/264 |
| 4,866,638 | * | 9/1989 | Cosentino ........................... 345/335 |
| 4,967,125 | * | 10/1990 | Hara ................................ 318/568.11 |
| 4,998,050 | * | 3/1991 | Nishiyama .......................... 700/248 |
| 5,053,975 | * | 10/1991 | Tsuchihashi ........................ 700/264 |
| 5,086,262 | * | 2/1992 | Hariki .............................. 318/568.1 |
| 5,136,223 | * | 8/1992 | Karakama ............................ 318/573 |
| 5,488,689 | * | 1/1996 | Yamato ............................... 700/264 |
| 5,668,930 | * | 9/1997 | Hamura ............................... 700/252 |

FOREIGN PATENT DOCUMENTS

A5-173626   7/1993   (JP) .

* cited by examiner

*Primary Examiner*—William Grant
*Assistant Examiner*—Ronald D. Hartman, Jr.

(57) ABSTRACT

The process effected by an application-deciding means as one of constitutive components of a display-processing means is used to start a teaching application corresponding to a robot model designated by using a coordinate input device, of a plurality of robot models displayed on a screen of a monitor to make it possible to perform teaching based on the designated robot model. Accordingly, it is possible to easily start the application corresponding to the designated robot model when the plurality of robot models displayed on the monitor are operated by using a keyboard or a pointing device (for example, a mouse).

12 Claims, 17 Drawing Sheets

FIG. 4

ROBOT INFORMATION TABLE 52

| | |
|---|---|
| 0 RECORD (ROBOT 1) | STORAGE HEAD ADDRESS OF IMAGE DATA |
| | DISPLAY RANGE |
| | STORAGE HEAD ADDRESS OF IMAGE DATA OF TEACHING BOX |
| | OPERATING APPLICATION PROGRAM NO. |
| | STORAGE HEAD ADDRESS OF TEACHING DATA |
| 1 RECORD (ROBOT 2) | STORAGE HEAD ADDRESS OF IMAGE DATA |
| | DISPLAY RANGE |
| | STORAGE HEAD ADDRESS OF IMAGE DATA OF TEACHING BOX |
| | OPERATING APPLICATION PROGRAM NO. |
| | STORAGE HEAD ADDRESS OF TEACHING DATA |
| 2 RECORD (ROBOT 3) | STORAGE HEAD ADDRESS OF IMAGE DATA |
| | DISPLAY RANGE |
| | STORAGE HEAD ADDRESS OF IMAGE DATA OF TEACHING BOX |
| | OPERATING APPLICATION PROGRAM NO. |
| | STORAGE HEAD ADDRESS OF TEACHING DATA |

⋮

OFF-LINE TEACHING METHOD AND APPARATUS FOR THE SAME

BACKGROUND OF THE INVENTION

1. Field of the Invention

The present invention relates to an off-line teaching method and an apparatus for the same to be used to operate a plurality of robot models displayed on a monitor by using a keyboard or a pointing device (for example, a mouse), wherein an application corresponding to a designated robot model can be easily started, and mutual interlock, which is effected when a plurality of robot models are operated, can be easily reflected on teaching data.

2. Description of the Related Art

Recently, in order to apply a robot to a variety of workings, in general, a variety of tools are attached to a face plate of a robot arm to allow the robot to perform the tasks.

The programming for the robot includes the on-line programming (on-line teaching) and the off-line programming (off-line teaching). In the case of the on-line teaching, the arm of the robot is moved to pass through necessary points or along a locus by using a push button, an operation button, an operation handle, and a joystick so that the control unit is allowed to store the points or the locus. When the robot is operated at the driving stage, the robot reproduces and executes the stored movement.

In the off-line teaching, the operation procedure is programmed without directly using the robot. In the case of the off-line teaching, the software is programmed such that the movement of each joint is calculated in order to move the end effector to a necessary position in a necessary direction.

The movement of the robot can be displayed in animation on a graphic terminal connected to a computer, by adding a graphic function to the system which is used to execute the off-line teaching. The off-line teaching based on the use of the graphic has the following advantages.

(1) When the operation program is debugged by using the graphic, it is possible to reduce the time and the labor as compared with a case in which an actual robot is used.

(2) It is possible for the user to begin programming before the robot is introduced. Further, various types of robots can be tested on the monitor screen to select a type of machine which is most suitable for the plan.

(3) It is possible to avoid conflict in view of surrounding situations when the movement of the robot is simulated.

(4) It is possible to use a common database of CAD/CAM. For example, when a computer for CAD/CAM stores a body shape of an automobile, the designer can designate the place to be subjected to spot welding.

In recent years, a technique has been suggested, in which an image of a teaching box corresponding to an actual robot is displayed on a monitor, and the point is designated by using a mouse or the like for the image of the teaching box to prepare off-line teaching data thereby (for example, Japanese Laid-Open Patent Publication No. 5-173626).

In this suggested illustrative technique, for example, as shown in FIG. 17, a plurality (four in the drawing) of robot models RM1 to RM4 are displayed on a screen of a monitor 200, and program numbers of teaching applications corresponding to the respective robot models RM1 to RM4 are simultaneously displayed on an upper-left portion of the screen. Images of teaching boxes TB1 to TB4 corresponding to the respective robot models RM1 to RM4 are displayed on an upper-right portion on the screen.

The type of the robot model to be subjected to teaching is judged by an operator, and a teaching box corresponding to the type is designated by using a mouse or the like. After that, a program number corresponding to a necessary teaching application is designated from the program numbers arranged in the selection menu by using the mouse or the like. Thus, the concerning teaching application is started.

In this case, when a plurality of types of robot models exist in an identical station in a mixed manner, it is necessary to perform a complicated operation for selecting the teaching application which is required for the robot model to be subjected to the teaching. Therefore, the starting operation takes much time and labor if the operator is not accustomed to the off-line teaching system. As a result, an inconvenience arises in that it is impossible to perform the operation with ease.

On the other hand, when a plurality of actual robots are installed at the working site, it is necessary to prepare the off-line teaching data considering the mutual interlock among the actual robots. Conventionally, a simulation program including mutual interlock has been prepared by editing a text-based program by using an editor.

In such a procedure, it is necessary to perform teaching simulation including mutual interlock actually executed by an operator for an actual robot. Therefore, it has been difficult to handle the system unless the operator is specially educated, or unless the operator knows details of the system.

SUMMARY OF THE INVENTION

The present invention has been made taking such problems into consideration, an object of which is to provide an off-line teaching method and an apparatus for the same which make it possible to easily start an application corresponding to a designated robot model when a plurality of robot models displayed on a monitor are operated by using a keyboard or a pointing device (for example, a mouse).

Another object of the present invention is to provide an off-line teaching method and an apparatus for the same which make it possible to easily reflect mutual interlock on teaching data when a plurality of robot models are operated, in addition to the requirement described above.

According to the present invention, there are provided an off-line teaching method and an apparatus for the same, comprising starting a teaching application corresponding to a robot model designated by using an input device, of a plurality of robot models displayed on a monitor and operated by different teaching programs respectively, making it possible to perform teaching based on the designated robot model.

Accordingly, the teaching application for the concerning robot model is started to make it possible for an operator to perform the teaching based on the robot model, only by designating, by using the input device, the robot model intended to be subjected to teaching, of the plurality of robot models displayed on the monitor.

As described above, in the off-line teaching method and the apparatus for the same according to the present invention, when the plurality of robot models displayed on the monitor are operated by using a keyboard or a pointing device (for example, a mouse), it is possible to easily start the application corresponding to the designated robot model. That is, the off-line teaching operation is intuitively comprehensible. The off-line teaching system can be used even when the operator is not specially educated.

It is preferable in the method and the apparatus described above that an image of a teaching box corresponding to the designated robot model is displayed on the monitor when the teaching application is started.

In the present invention, the off-line teaching data can be prepared by using the image of the teaching box without using any actual teaching box. Therefore, for example, it is possible to reduce the production cost for the hardware.

According to the present invention, each robot model has a designated active zone around it within which program steps linked to the robot model can be activated. When a plurality of robot models are designated, the active zones of each robot model may overlap, thereby forming interference regions. The present invention senses the existence of the interference regions and forms a mutual interlocking system which prioritizes the execution of the relevant process steps, based on timing, which is reflected in the teaching data.

Accordingly, at first, the action zones based on the respective teaching data for the plurality of designated robot models are decided, and then the interference regions of the plurality of robot models are decided from the action zones. The mutual interlock is established for the invasion of the plurality of robot models into the interference regions. The timing for the mutual interlock is reflected on the teaching data.

In the present invention, the mutual interlock, which is established when the plurality of robot models are allowed to act, is automatically reflected on the teaching data with ease. Therefore, when the teaching data are prepared for the plurality of robot models, then it is unnecessary for the operator to consider the mutual interlock, and the operability is improved corresponding thereto. The off-line teaching system can be successfully used even when the operator is not specially educated. This contributes to popularization of the off-line teaching system.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 illustrates contents of a robot information table;

DESCRIPTION OF THE PREFERRED EMBODIMENTS

An illustrative embodiment of an off-line teaching apparatus for realizing the off-line teaching method and the apparatus therefor according to the present invention (hereinafter simply referred to as "off-line teaching apparatus according to the embodiment") will be explained below with reference to FIGS. 1 to 16.

Figure 1:
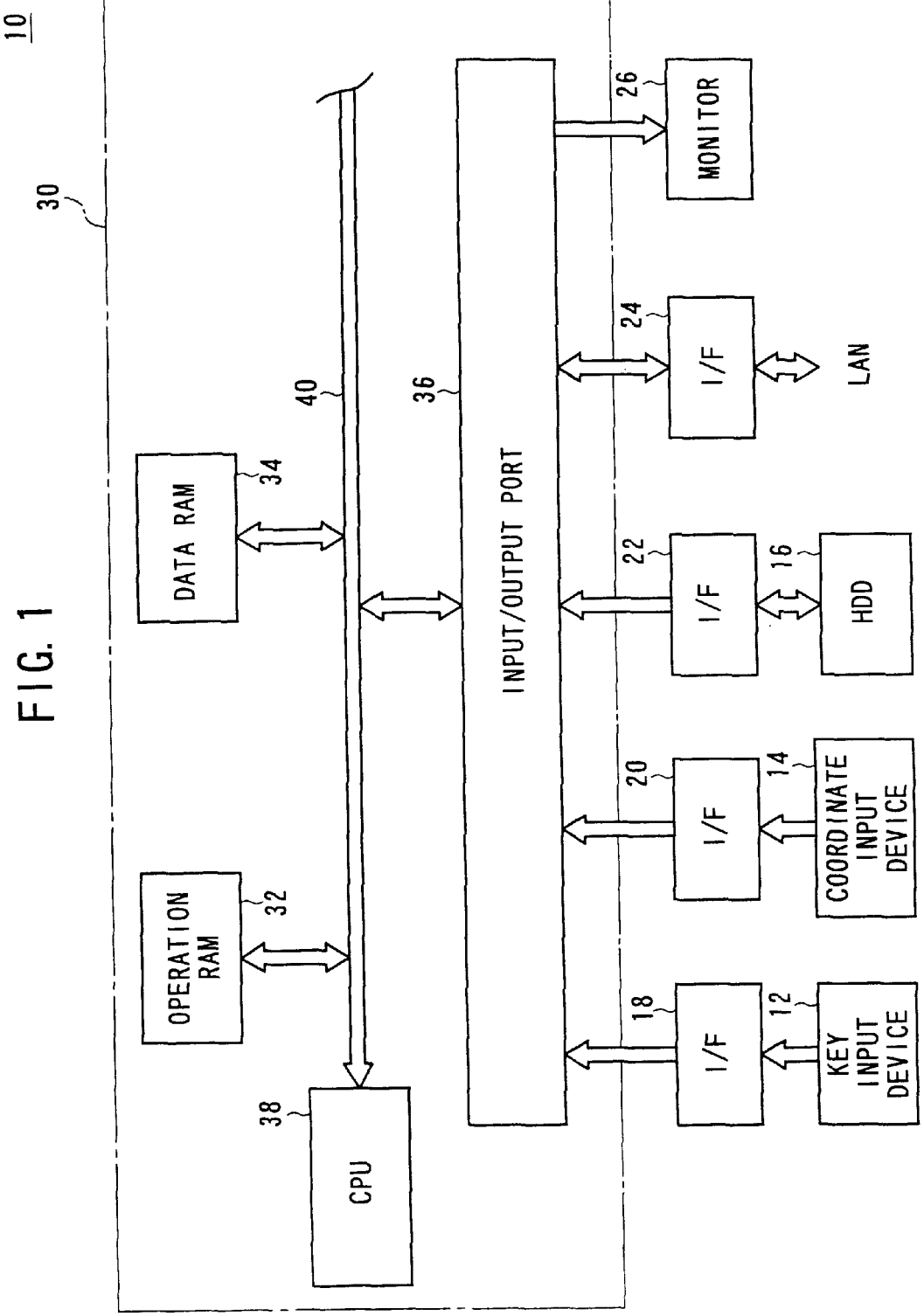
FIG. 1 shows a block diagram illustrating a hardware arrangement of an off-line teaching apparatus according to an embodiment of the present invention.

As shown in FIG. 1, the off-line teaching apparatus 10 according to the embodiment of the present invention comprises a key input device 12 such as a keyboard, a coordinate input device 14 (pointing device) such as a mouse and a joystick, and a hard disk drive (HDD) 16 for performing recording and reproduction, for example, on a hard disk as an external storage medium, which are connected via interface (simply referred to as "I/F") circuits 18, 20, 22 respectively. The off-line teaching apparatus 10 is further connected with LAN to be used for delivering, for example, teaching data with respect to other off-line teaching apparatuses via an I/F circuit 24. The off-line teaching apparatus 10 further comprises a monitor 26 for displaying the teaching data incorporated via LAN and the teaching data prepared by using the off-line teaching apparatus 10.

The off-line teaching apparatus 10 has a control system 30 which comprises an operation RAM 32 for executing various programs (for example, teaching processing programs), a data RAM 34 for storing, for example, data supplied from external devices (for example, LAN, coordinate input device 14, HDD 16) and data subjected to data processing based on various programs, an input/output port 36 for inputting/outputting data with respect to the external devices, and CPU (control unit and logical operation unit) 38 for controlling the various types of circuits.

The various types of circuits are subjected to data delivery between the respective circuits via a data bus 40 led from CPU 38, and they are controlled by CPU 38 respectively via an address bus and a control bus (both are not shown) led from CPU 38.

Figure 2:
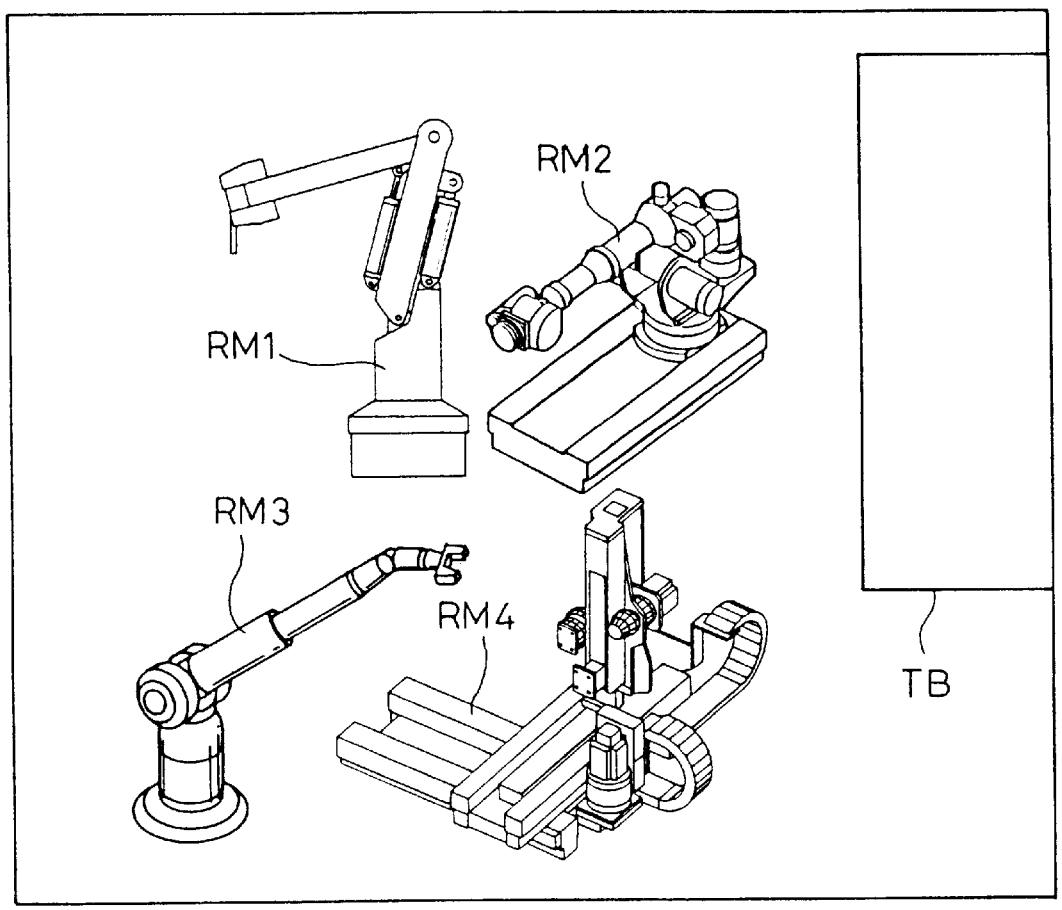
FIG. 2 illustrates a first function of the off-line teaching apparatus according to the embodiment of the present invention, depicting an example in which four robot models and a teaching box corresponding to a designated robot model are displayed on a monitor screen.

The off-line teaching apparatus 10 according to the embodiment of the present invention has two functions to improve the operability. For example, as shown in FIG. 2, the first function makes it possible to start a teaching application corresponding to a robot model designated, for example, by the coordinate input device 14, of a plurality of robot models RM1 to RM4 displayed on a screen of the monitor 26 so that the operability of the off-line teaching is improved.

Figure 3:
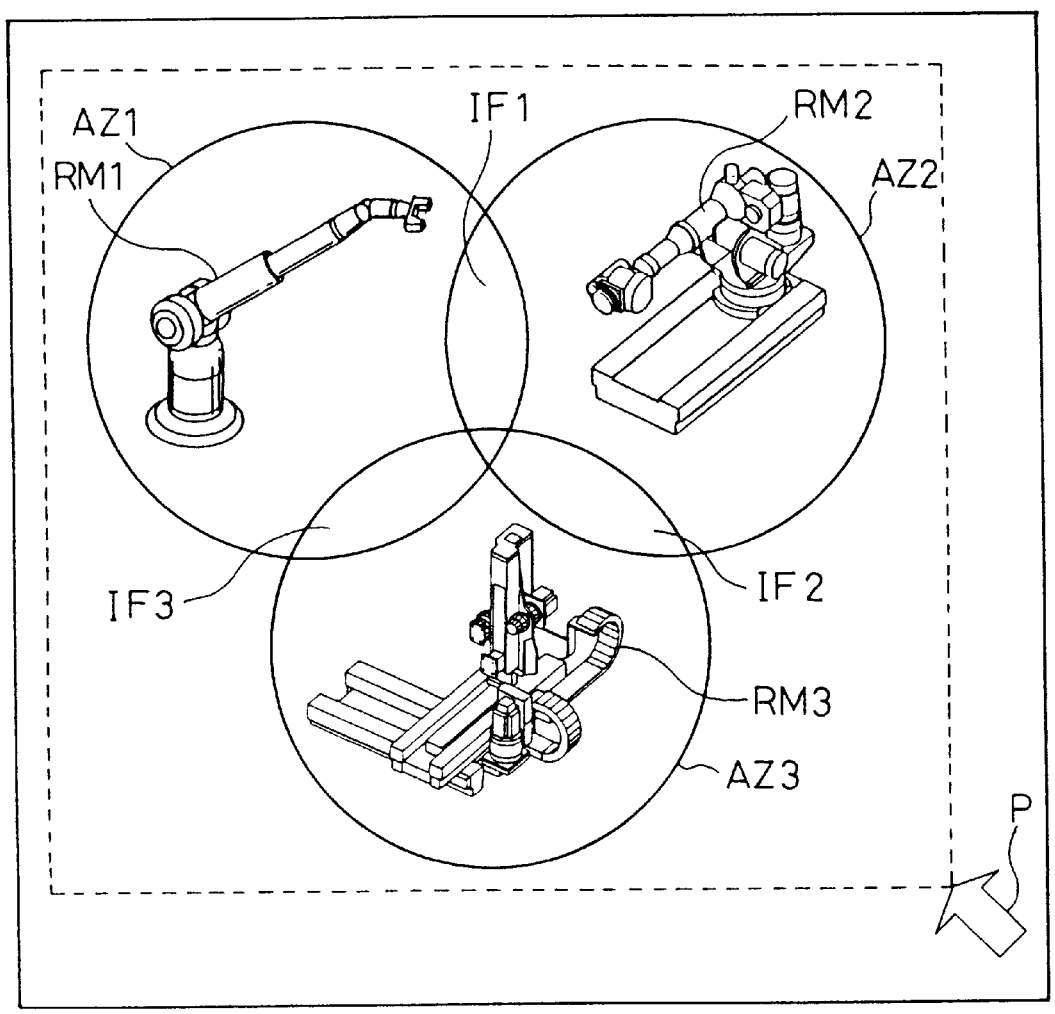
FIG. 3 illustrates a second function of the off-line teaching apparatus according to the embodiment of the present invention, depicting an example in which mutual interference regions are defined from action zones of three designated robot models.

On the other hand, for example, as shown in FIG. 3, the second function makes it possible to automatically reflect the mutual interlock on teaching data when a plurality of robot models RM1 to RM3 are allowed to make action so that the operability of the off-line teaching is improved.

Figure 9:
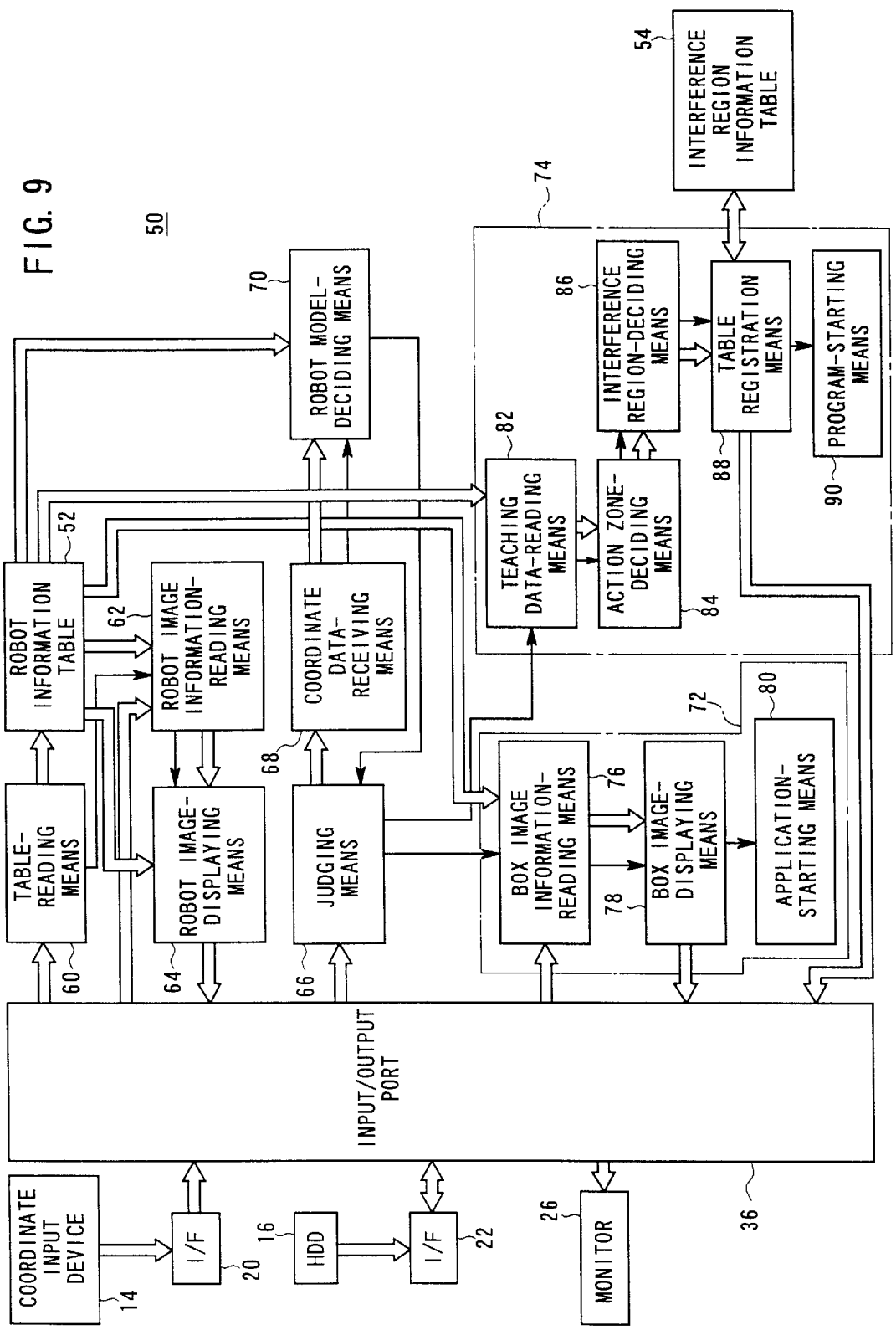
FIG. 9 shows a functional block diagram illustrating an arrangement of a display-processing means.

The first and second functions are achieved by executing a display-processing means (display-processing program: FIG. 9) 50. The display-processing means 50 is based on the use of a robot information table 52 and an interference region information table 54 as shown, for example, in FIGS. 4 and 5.

For example, as shown in FIG. 4, the robot information table 52 comprises a plurality of records corresponding to the plurality of robot models RM1 to RM4 existing at an identical station. Each of the records is registered with a storage head address (relative logical address) on the hard disk on which image data of the robot model RM1 to RM4 is stored, a display range on the monitor 26, a storage head address (relative logical address) on the hard disk on which image data of a teaching box corresponding to the robot model is stored, a program number of an operating application corresponding to the robot model, and a storage head address (relative logical address) on the hard disk on which teaching data corresponding to the robot model is stored.

Figure 5:
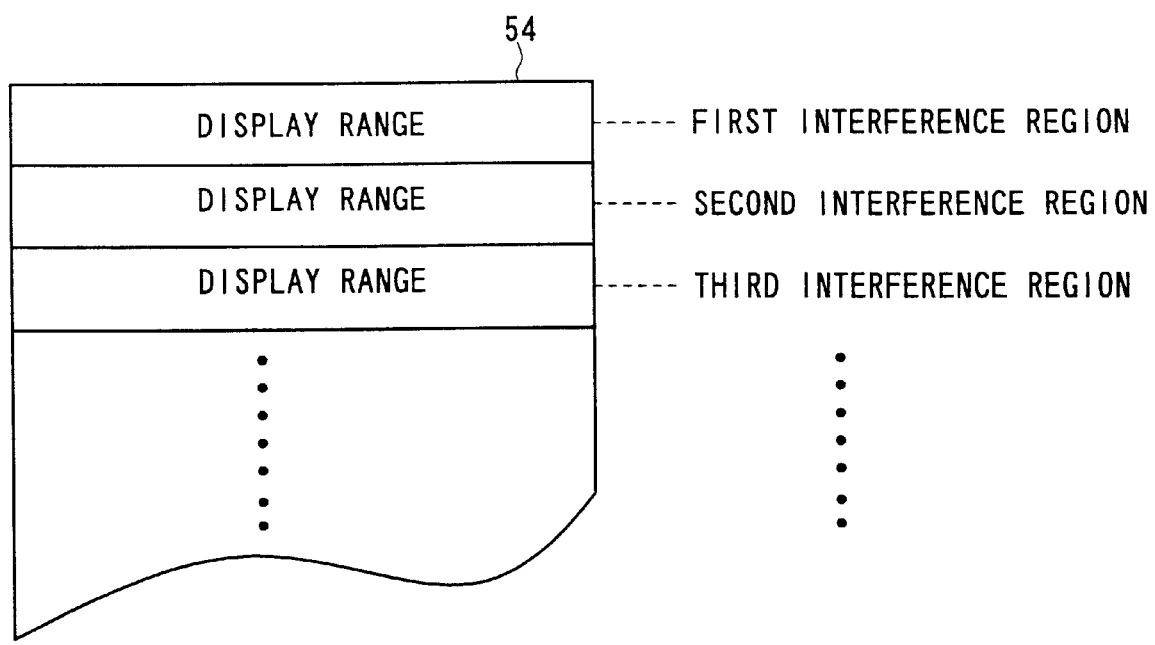
FIG. 5 illustrates contents of an interference region information table.

As shown in FIG. 5, the interference region information table 54 comprises a plurality of records corresponding to interference regions IF1 to IF3 derived from action zones of the plurality of robot models RM1 to RM3 (see FIG. 3). Each of the records is registered with a display range of the corresponding interference region.

As shown in FIG. 9, the display-processing means 50 comprises a table-reading means 60 for reading the robot information table 52 recorded on the hard disk and storing read data in a predetermined storage region on the data RAM 34, a robot image information-reading means 62 for reading image data of the robot models RM1 to RM4 from the hard disk on the basis of the storage head addresses of the image data of the robot models RM1 to RM4 registered with the robot information table 52, a robot image-displaying means 64 for magnifying/reducing processing the image data of the robot models RM1 to RM4 read by the robot image information-reading means 62 on the basis of the display ranges to make display on the screen of the monitor 26, a judging means 66 for making various judgements, a coordinate data-receiving means 68 for receiving inputted coordinate data, a robot model-deciding means 70 for deducing a robot model designated at this time on the basis of the display range registered with the robot information table 52 and the received coordinate data, an application-deciding means 72 for displaying a teaching box TB corresponding to the robot model if the single robot model is designated so that a teaching application is started, and an interference region-setting means 74 for deducing interference regions IF1 to IF3 for designated robot models if the plurality of robot models are designated to make registration with the interference region information table 54 so that necessary programs are started.

The application-deciding means 72 includes a box image-reading means 76 for reading image data of the teaching box TB from the hard disk on the basis of the storage head address of the image data of the teaching box TB from the concerning record in the robot information table 52, a box image-displaying means 78 for displaying the image data of the teaching box TB read by using the box image information-reading means 76, at a predetermined position on the monitor 26, and an application-starting means 80 for starting a teaching application corresponding to a program number registered in the concerning record in the robot information table 52.

The interference region-setting means 74 includes a teaching data-reading means 82 for reading teaching data from the hard disk on the basis of the storage head addresses of the teaching data registered in the records corresponding to the plurality of designated robot models in the robot information table 52, an action zone-deciding means 84 for deducing action zones AZ1 to AZ3 of the respective robot models RM1 to RM3 (see FIG. 3) on the basis of the read teaching data, an interference region-deciding means 86 for deducing interference regions IF1 to IF3 from the respective deduced action zones AZ1 to AZ3, a table registration means 88 for registering display ranges of the deduced interference regions IF1 to IF3 with the interference region information table 54, and a program-starting means 90 for starting a simulation-processing means (simulation-processing program) 150 as described later on corresponding to the plurality of designated robot models RM1 to RM3 and starting an interlock-processing means (interlock-processing program) 100. The interlock-processing program 100 and the simulation-processing program 150 are operated in a time sharing manner (time-shared system).

Next, the processing operation performed by the display-processing means 50 will be explained with reference to flow charts shown in FIGS. 10 and 11.

Figure 10:
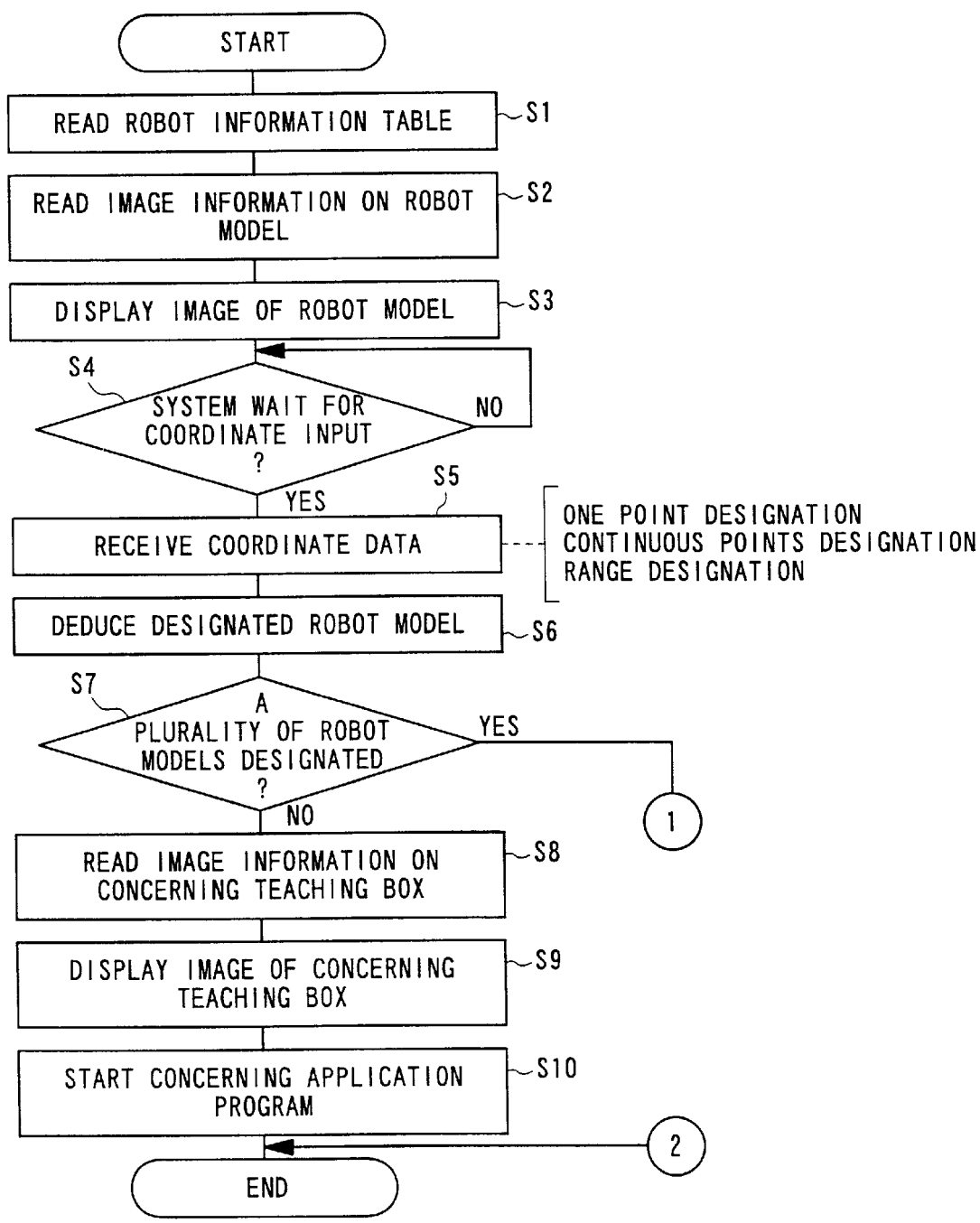
FIG. 10 shows a flow chart (No. 1) illustrating a processing operation effected by the display-processing means.
Figure 11:
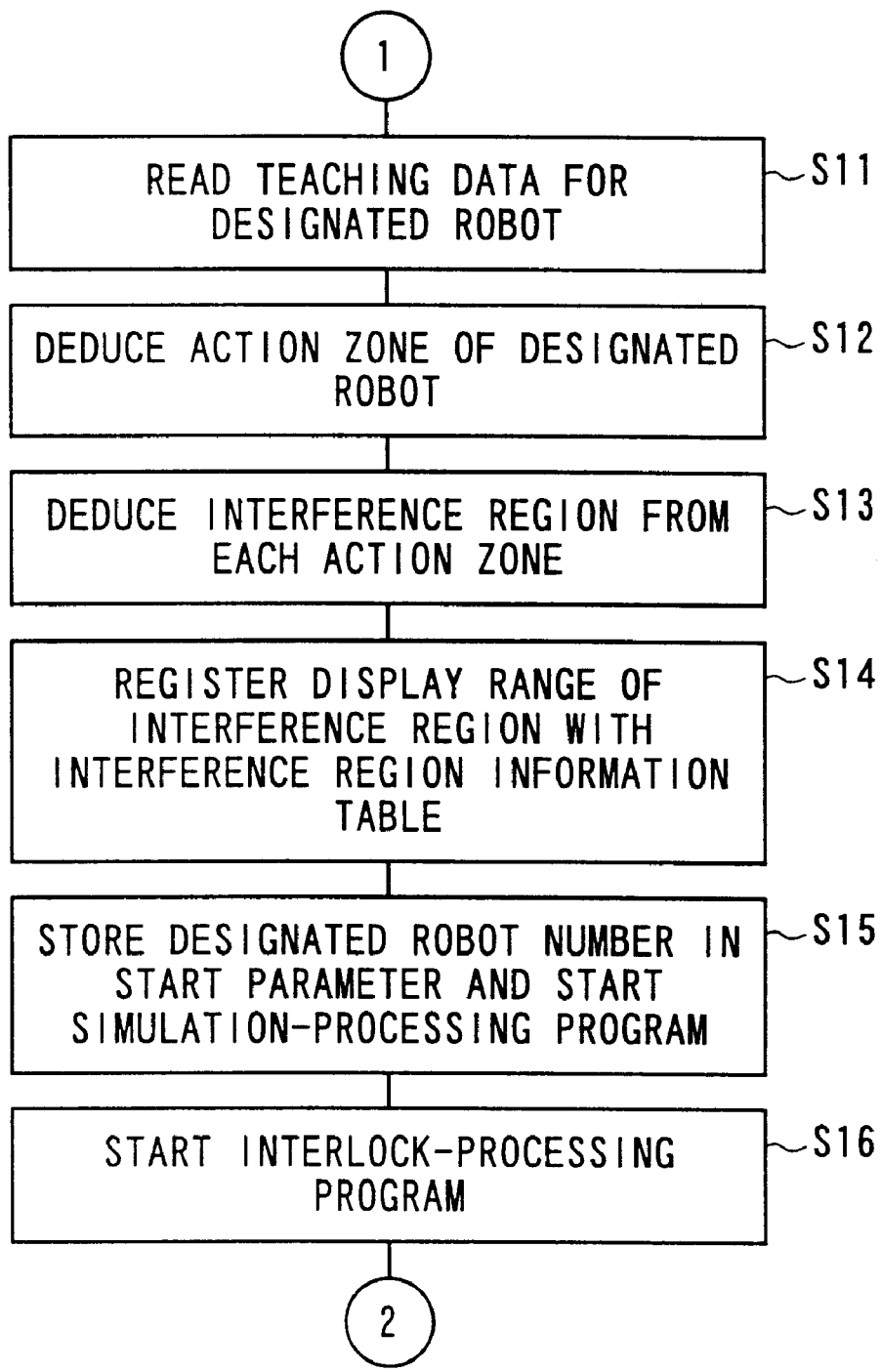
FIG. 11 shows a flow chart (No. 2) illustrating a processing operation effected by the display-processing means.

At first, in a step S1 shown in FIG. 10, the table-reading means 60 is used to read the robot information table 52 recorded on the hard disk and store read data in a predetermined storage region on the data RAM 34.

Next, in a step S2, the robot image information-reading means 62 is used to read the storage head addresses of the image data of all of the robot models RM1 to RM4 (see FIG. 2) registered in the robot information table 52. The image data of all of the robot models RM1 to RM4 are read from the hard disk by the aid of HDD 16 on the basis of the storage head addresses.

Next, in a step S3, the robot image-displaying means 64 is used to read all of the registered display ranges from the robot information table 52. The read image data of the robot models RM1 to RM4 are processed to make magnification/reduction on the basis of the display ranges so that the images are displayed on the screen of the monitor 26. FIG. 2 shows an example of display of the four robot models RM1 to RM4 on the screen of the monitor 26.

Next, in a step S4, the judging means 66 is used to judge whether or not the coordinate data is inputted from the coordinate input device 14. The step S4 is repeated until the coordinate data is inputted. That is, the system waits for the coordinate data input.

If the coordinate data is inputted, the routine proceeds to the next step S5 to receive the inputted coordinate data by the aid of the coordinate data-receiving means 68.

The designation effected by the coordinate input device 14 includes, for example, one point designation effected by double-click for the left button of the mouse (hereinafter simply referred to as "click"), continuous points designation effected by click while pushing the CTRL key or the SHIFT key, and range designation effected by drag for the mouse.

Next, in a step S6, the robot model-deciding means 70 is used to read all of the display ranges registered in the robot information table 52. The robot model designated at this time is deduced on the basis of the display ranges and the received coordinate data.

Next, in a step S7, the judging means 66 is used to judge whether or not a plurality of robot models are designated at this time. If a single robot model is designated, the processing is performed by using the application-deciding means 72 as the first function.

That is, in a step S8, the box image information-reading means 76 is used to read the storage head address of the image data of the teaching box TB from the record corresponding to the robot model designated at this time. The image data of the teaching box is read from the hard disk by the aid of HDD 16 on the basis of the storage head address.

Next, in a step S9, the image data of the teaching box TB read at the previous time is outputted to the monitor 26 by the aid of the image-displaying means 78 to make display at a predetermined position on the screen of the monitor 26. FIG. 2 shows an example in which the image of the teaching box TB corresponding to the robot model designated at this time is displayed on the upper-right portion on the screen.

Next, in a step S10, the application-starting means 80 is used to read the program number from the record corresponding to the robot model designated at this time, of the robot information table 52 so that the teaching application program corresponding to the program number is started. The teaching for the robot model designated at this time is performed from this stage by using the teaching box TB displayed on the screen of the monitor 26.

On the other hand, if it is judged in the step S7 that a plurality of robot models are designated at this time, for example, as shown in FIG. 3, three robot models RM1 to RM3 are designated by dragging the pointer P of the mouse. In this case, the process is performed by means of the interference region-setting means 74.

This process is executed as follows. That is, at first, in a step S11 shown in FIG. 11, the teaching data-reading means 82 is used to read the storage head addresses of the teaching data respectively from the records corresponding to all of the robot models RM1 to RM3 designated at this time from the robot information table 52. The teaching data are read from the hard disk by the aid of HDD 16 on the basis of the storage head addresses.

Next, in a step S12, the action zone-deciding means 84 is used to deduce the action zones AZ1 to AZ3 for the respective robot models RM1 to RM3 on the basis of the teaching data read as described above. In the example shown in FIG. 3, the action zones AZ1 to AZ3 for the respective robot models RM1 to RM3 are simply depicted by circles.

Next, in a step S13, the interference region-deciding means 86 is used to deduce the interference regions IF1 to IF3 from the respective deduced action zones AZ1 to AZ3. For example, as shown in FIG. 3, the regions, in which the action zones AZ1 to AZ3 of the respective robot models RM1 to RM3 are overlapped with each other, are the interference regions IF1 to IF3.

When the interference regions IF1 to IF3 are decided, the portions, in which the action zones are overlapped with each other, may be simply regarded as the interference regions IFI to IF3 on the basis of the action zones AZ1 to AZ3 of the respective robot models RM1 to RM3. However, there is a possibility that any inconvenience occurs in the system at the working site depending on the way to determine the interference regions.

Therefore, a necessary condition may be set depending on the system at the working site, and the interference regions may be designated to satisfy the condition. For example, the interference regions are optimally set so that the cycle time for the system is minimized, or the interference regions are set so that the respective robots can smoothly make action. Alternatively, for example, the order of precedence is newly defined for each of the robots to construct an algorithm for optimization.

Next, in a step S14, the table registration means 88 is used to register the display ranges of the deduced interference regions IF1 to IF3 with the interference region information table 54 (see FIG. 5).

Next, in a step S15, the program-starting means 90 is used to store the numbers of the robot models RM1 to RM3 designated at this time in the start parameter and start the simulation-processing means (simulation-processing program) 150. In this embodiment, the simulation-processing program 150 is started corresponding to each of the three robot models RM1 to RM3.

Next, in a step S16, the program-starting means 90 is used to start the interlock-processing means (interlock-processing program) 100.

The processing operation performed by the display-processing means 50 comes to an end at the stage at which the process for starting the teaching application in the step S10 or the process for starting the program in the step S16 is completed.

Next, the interlock-processing means 100, which is started in the step S16 of the display-processing means 50, will be explained with reference to FIGS. 12 and 13. The interlock-processing means 100 uses the interference region information table 54 shown in FIG. 5, as well as an occupation information table 102 shown in FIG. 6, an interlock flag 104 shown in FIG. 7, a stop request flag 106 shown in FIG. 7, and a display history file 108 shown in FIG. 8.

Figure 6:
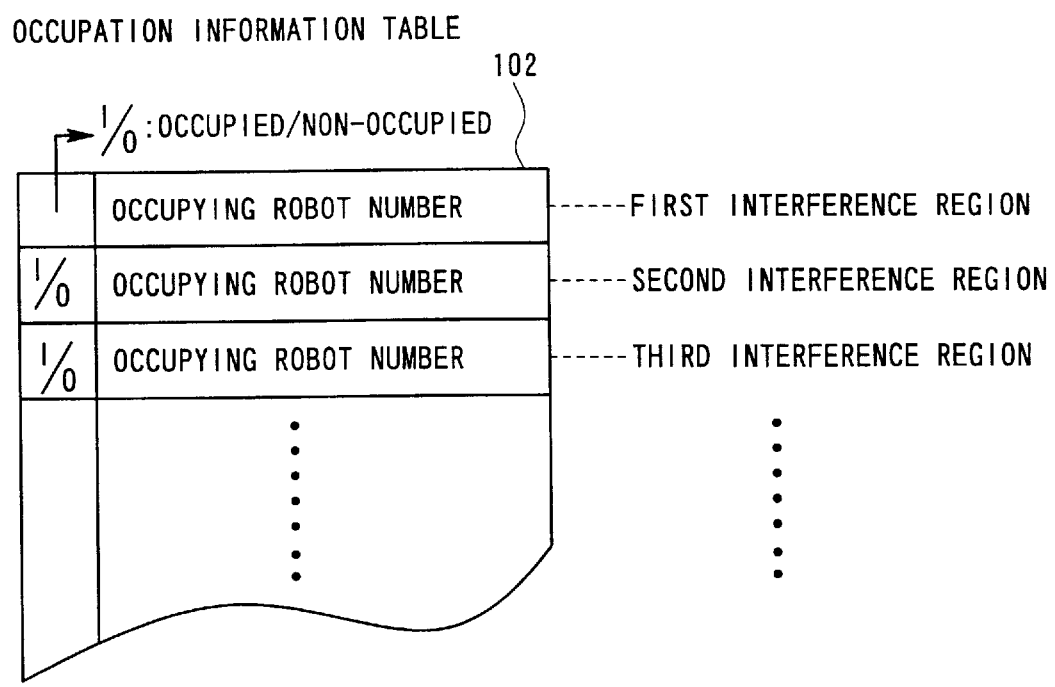
FIG. 6 illustrates contents of an occupation information table.

As shown in FIG. 6, the occupation information table 102 comprises a plurality of records corresponding to the interference regions IF1 to IF3 deduced from the action zones AZ1 to AZ3 of the plurality of designated robot models RM1 to RM3 (see FIG. 3). Each of the records is registered with the bit information which indicates the occupied/non-occupied state, and the occupying robot number.

Figure 8:
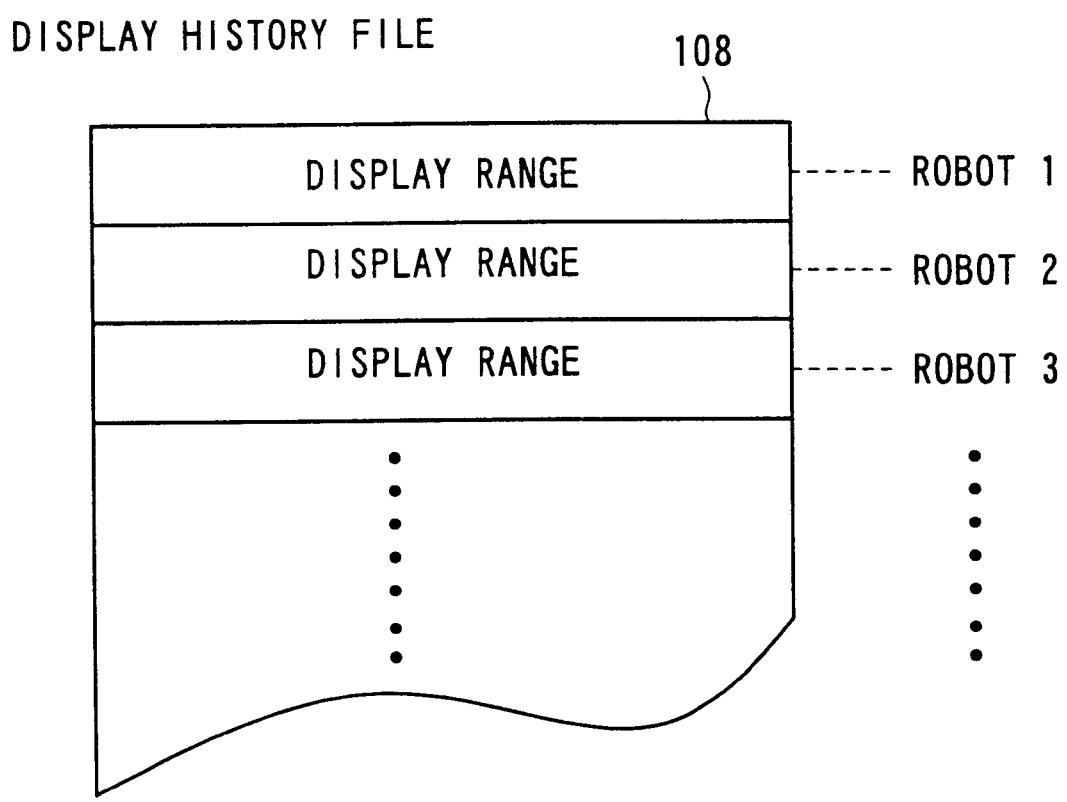
FIG. 8 illustrates contents of a display history file.

As shown in FIG. 8, the display history file 108 comprises a plurality of records corresponding to the plurality of designated robot models RM1 to RM3 (see FIG. 3). Each of the records is registered with the display range of the corresponding robot model. The display history file 108 is successively updated by the aid of a display range-updating means 166 (see FIG. 14) of the simulation-processing means 150 as described later on.

Figure 7:
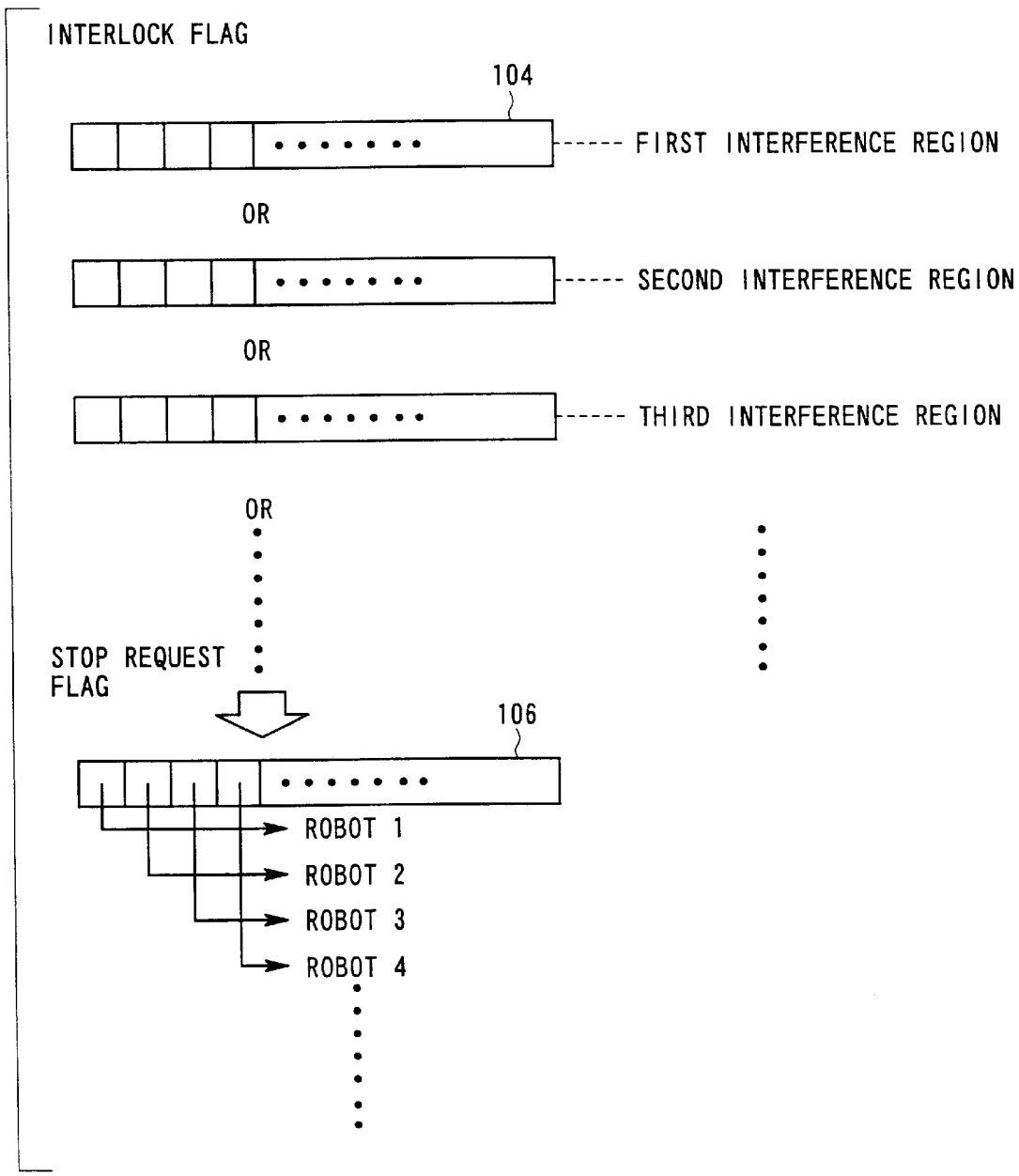
FIG. 7 illustrates contents of an interlock flag and a stop request flag.

As shown in FIG. 7, the number of allotted interlock flags 104 corresponds to the number of interference regions IF1 to IF3 deduced from the action zones AZ1 to AZ3 of the plurality of designated robot models RM1 to RM3. Each of the interlock flags 104 is registered with the number of bit information corresponding to the number of designated robot models RM1 to RM3. Each of the bit information is in the form of 1/0=stop request/enabling request.

As shown in FIG. 7, the stop request flag 106 is registered with the number of bit information corresponding to the number of designated robot models RM1 to RM3. Each of the bit information is in the form of 1/0=stop request/enabling request.

Figure 12:
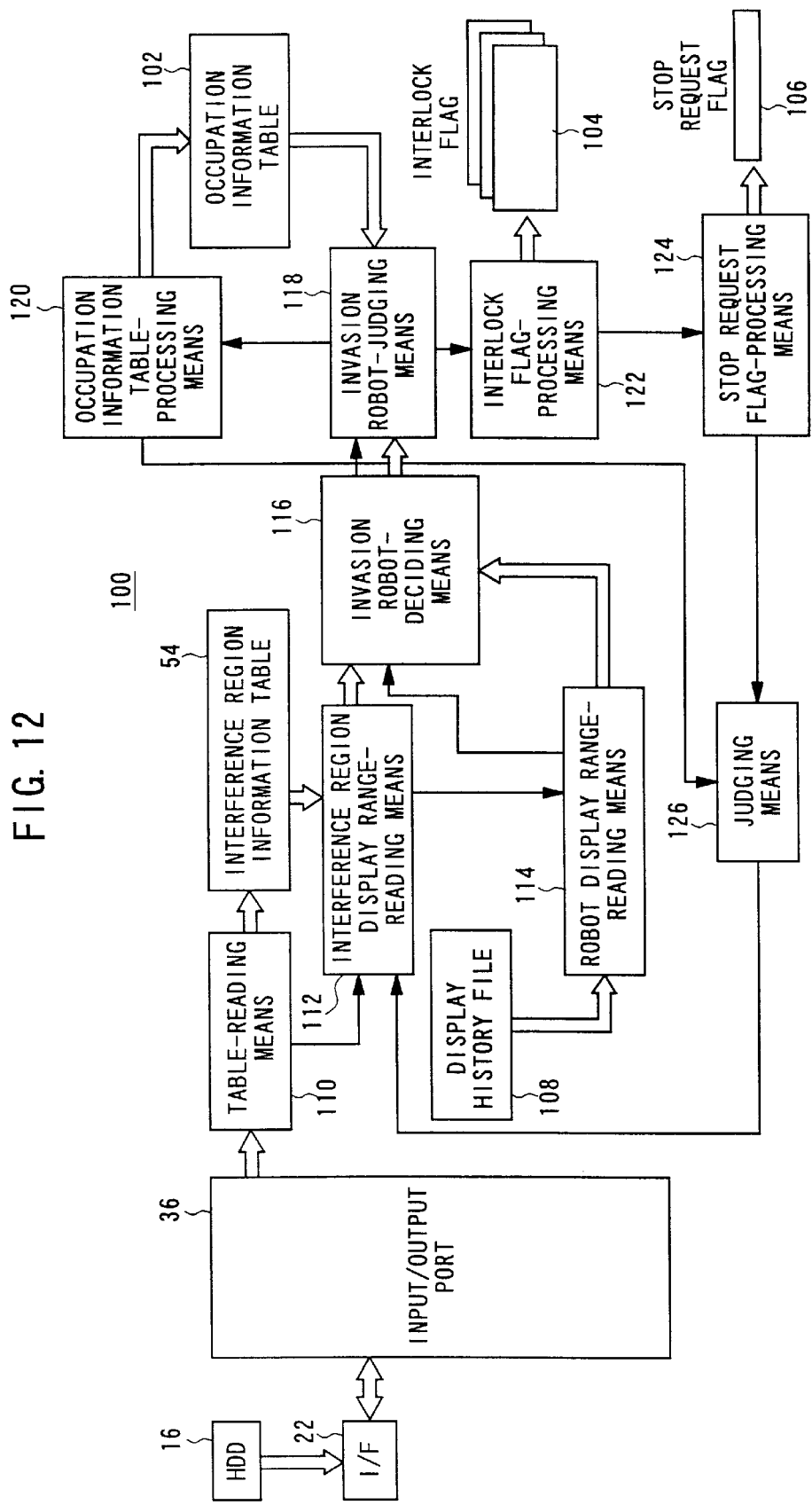
FIG. 12 shows a functional block diagram illustrating an arrangement of an interlock-processing means.
Figure 13:
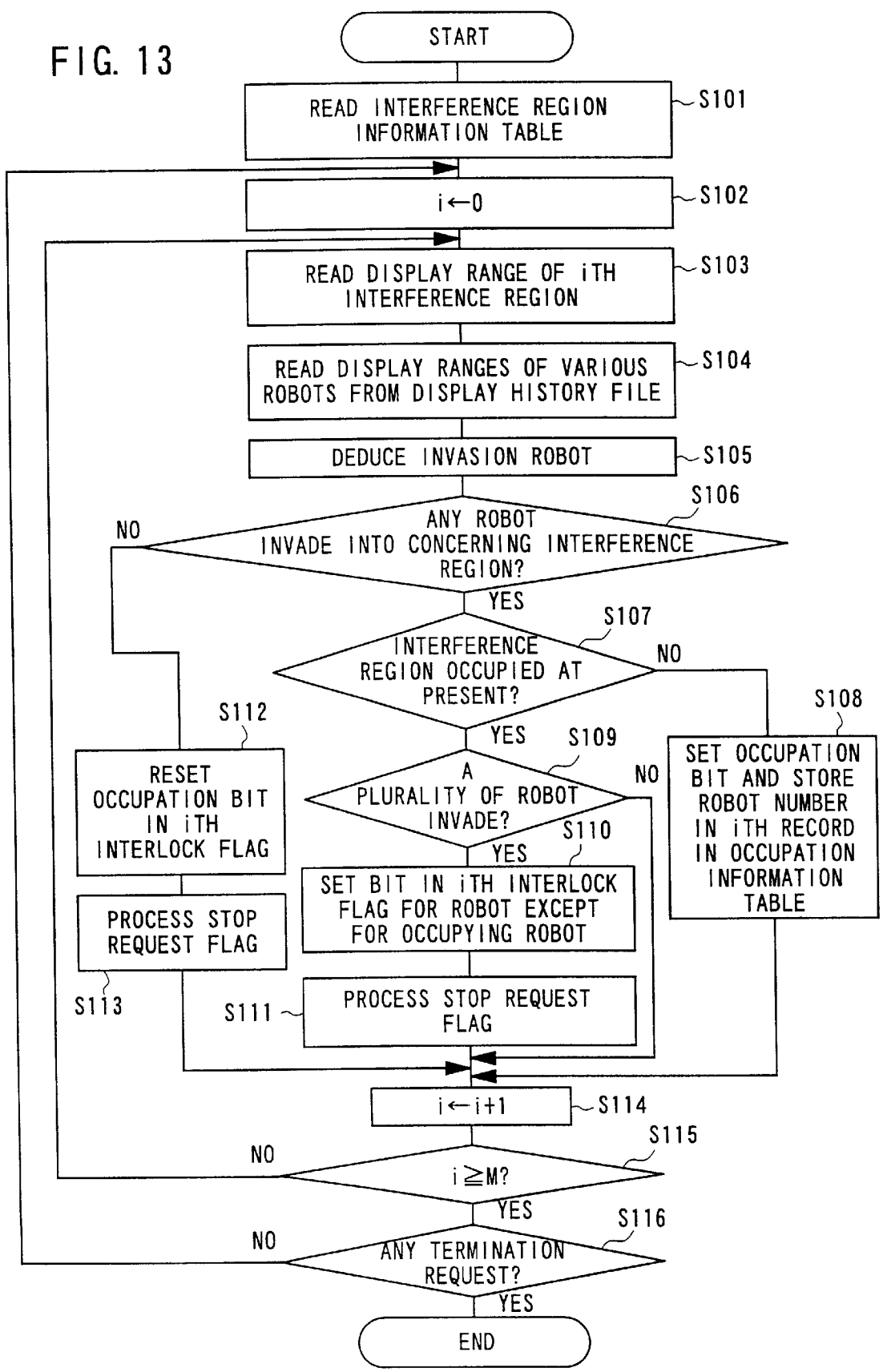
FIG. 13 shows a flow chart illustrating a processing operation effected by the interlock-processing means.

As shown in FIG. 12, the interlock-processing means 100 comprises a table-reading means 110 for reading the interference region information table 54 recorded on the hard disk to store read data in a predetermined storage region on the data RAM 34, an interference region display range-reading means 112 for reading a necessary display range of the interference region from the read interference region information table 54, a robot display range-reading means 114 for reading the display ranges for the respective robot models RM1 to RM3 from the display history file 108, an invasion robot-deciding means 116 for deducing the robot model which invades the interference region, on the basis of the display ranges of the read interference regions and the display ranges of the respective robot models RM1 to RM3, an invasion robot-judging means 118 for judging, for example, the presence or absence and the number of robot model or models invading into the interference region, an occupation information table-processing means 120 for registering the bit information indicating the occupied/non-occupied state and the occupying robot number with the necessary record in the occupation information table 102, an interlock flag-processing means 122 for setting or resetting the concerning bit of the interlock flag corresponding to the interference region necessary to be occupied, of the plurality of interlock flags 104, a stop request flag-processing means 124 for preparing the stop request flag 106 on the basis of all of the interlock flags 104, and a judging means 126 for judging, for example, whether or not the program comes to an end.

Next, the processing operation performed by the interlock-processing means 100 will be explained with reference to a flow chart shown in FIG. 13.

At first, in a step S101, the table-reading means 110 is used to read the interference region information table 54 recorded on the hard disk so that read data is stored in a predetermined storage region on the data RAM 34.

Next, in a step S102, an initial value "0" is stored in an index register i to be used as an index for the decided interference regions IFI to IF3 so that the index register i is initialized.

Next, in a step S103, the interference region display range-reading means 112 is used to read the display range of the ith interference region from the record (i record) indicated by the value of i of the index register in the interference region information table 54.

Next, in a step S104, the robot display range-reading means 114 is used to read the display ranges of all of the designated robot models RM1 to RM3 from the display history file 108.

Next, in a step S105, the invasion robot-deciding means 116 is used to deduce the robot model (robot number) which invades into the ith interference region, on the basis of the display range of the ith interference region read as described above and the display ranges of all of the robot models RM1 to RM3.

Next, in a step S106, the invasion robot-judging means 118 is used to judge whether or not any robot model invades into the ith interference region.

If any robot model invades into the interference region, the routine proceeds to the next step S107 to judge whether or not the interference region is occupied at present, by the aid of the invasion robot-judging means 118 as well. This judgement is made depending on whether or not the bit information in the ith record in the occupation information table 102 is "1: occupied". If the bit information is "0: non-occupied", the routine proceeds to the step S108. The occupation information table-processing means 120 is used to set "1: occupied" as the bit information for the ith record in the occupation information table 102, and store the robot number of the deduced robot model in the concerning ith record.

On the other hand, if it is judged in the step S107 that the interference region is occupied at present, the routine proceeds to the next step S109. The invasion robot-judging means 118 is used to judge whether or not a plurality of robot models invade into the ith interference region. If the plurality of robot models make invasion, the routine proceeds to the next step S110. The interlock flag-processing means 122 is used to set the bit concerning the robot model except for the occupying robot model, of the ith interlock flag 104 to be "1".

Next, in a step S111, the stop request flag-processing means 124 is used to perform OR operation for all of the interlock flags 104. A result of the operation is registered as the bit information of the stop request flag 106.

On the other hand, if it is judged in the step S106 that no robot model invades into the ith interference region, the interlock flag-processing means 122 is used in a step S112 to reset all of the bits of the ith interlock flag 104.

Next, in a step S113, the stop request flag-processing means 124 is used to perform OR operation for all of the interlock flags 104. A result of the operation is registered as the bit information of the stop request flag.

At the stage at which the process in the step S108, S111, or S113 is completed, or if it is judged in the step S109 that a single robot model invades into the ith interference region, the routine proceeds to the next step S114 to update the value of the index register i by +1.

After that, in a step S115, the judging means 126 is used to judge whether or not the process is completed for all of the interference regions IF1 to IF3. This judgement is made depending on whether or not the value of the index register i is not less than the number of decision of the interference regions IF1 to IF3.

If the process is not completed for all of the interference regions IF1 to IF3, the routine returns to the step S103 to repeat the process in the step S103 and the followings. That is, the process is performed for the next interference region.

If it is judged in the step S115 that the process is completed for all of the interference regions IF1 to IF3, the routine proceeds to the next step S116. The judging means 126 is used to judge whether or not there is any program termination request. This judgement is made depending on whether or not there is any occurrence of termination request interrupt such as power source OFF.

If there is no termination request, the routine returns to the step S102 to repeat the process for the interference region from the beginning. If there is any termination request, the interlock-processing program 100 comes to an end.

Figure 15:
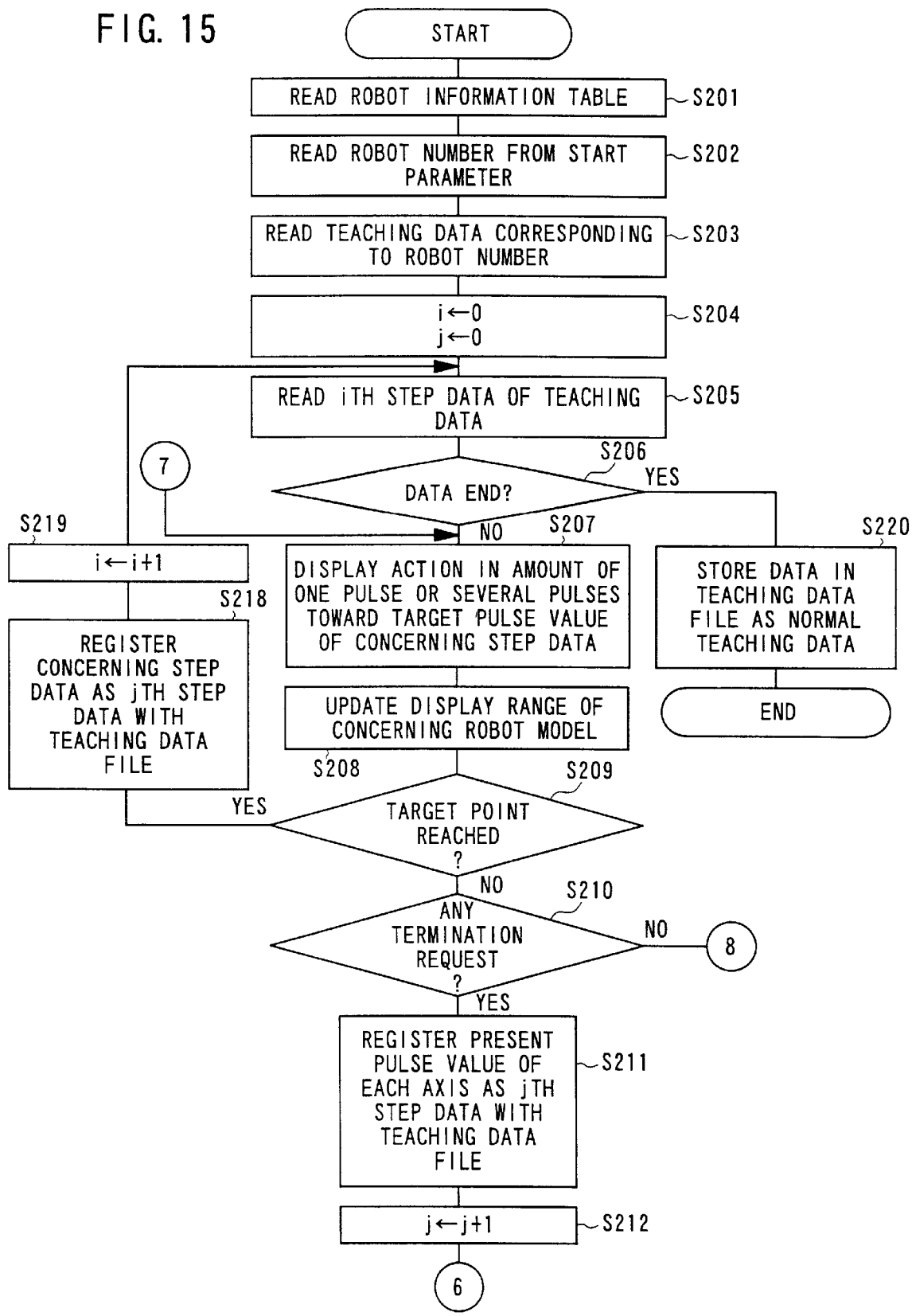
FIG. 15 shows a flow chart (No. 1) illustrating a processing operation effected by the simulation-processing means.
Figure 16:
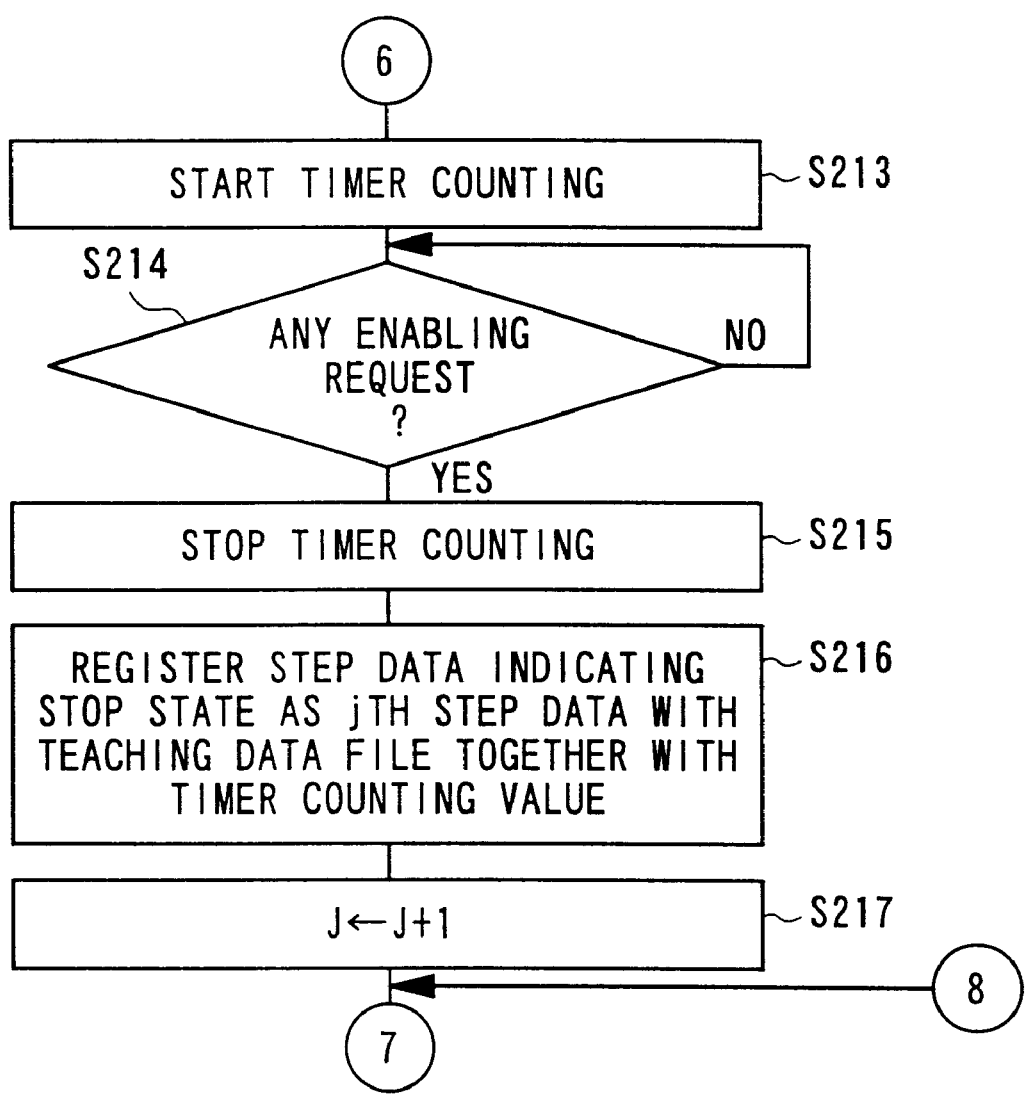
FIG. 16 shows a flow chart (No. 2) illustrating a processing operation effected by the simulation-processing means.
Figure 17:
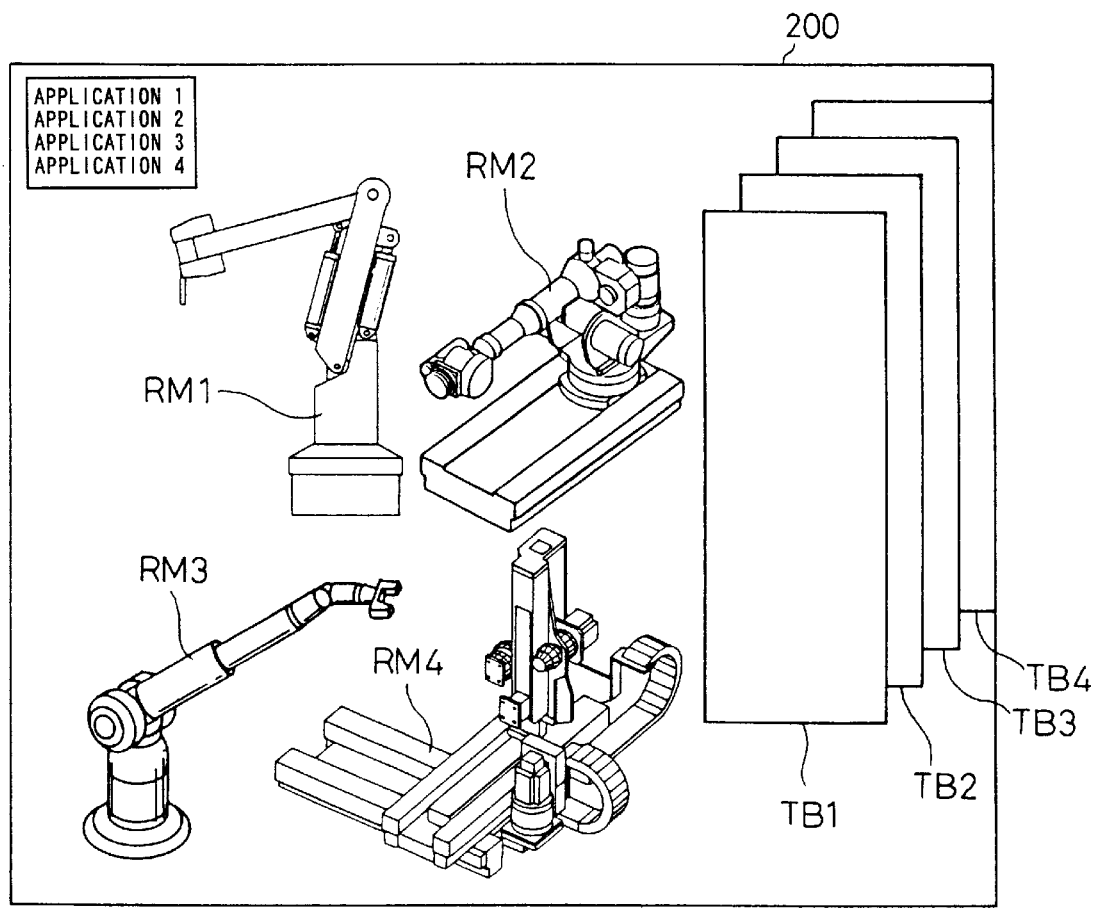
FIG. 17 illustrates an off-line teaching method concerning the suggested illustrative technique.

Next, the simulation-processing means 150, which is started in the step S15 of the display-processing means 50, will be explained with reference to FIGS. 14 to 16. It is assumed, for example, that the teaching data handled herein resides in data construction in which the pulse value (for example, relative value) for each axis of the robot model is registered for each step. Especially, it is assumed that the pulse value indicating "0". and the information indicating the stop time are incorporated as step data for indicating the stop state.

Figure 14:
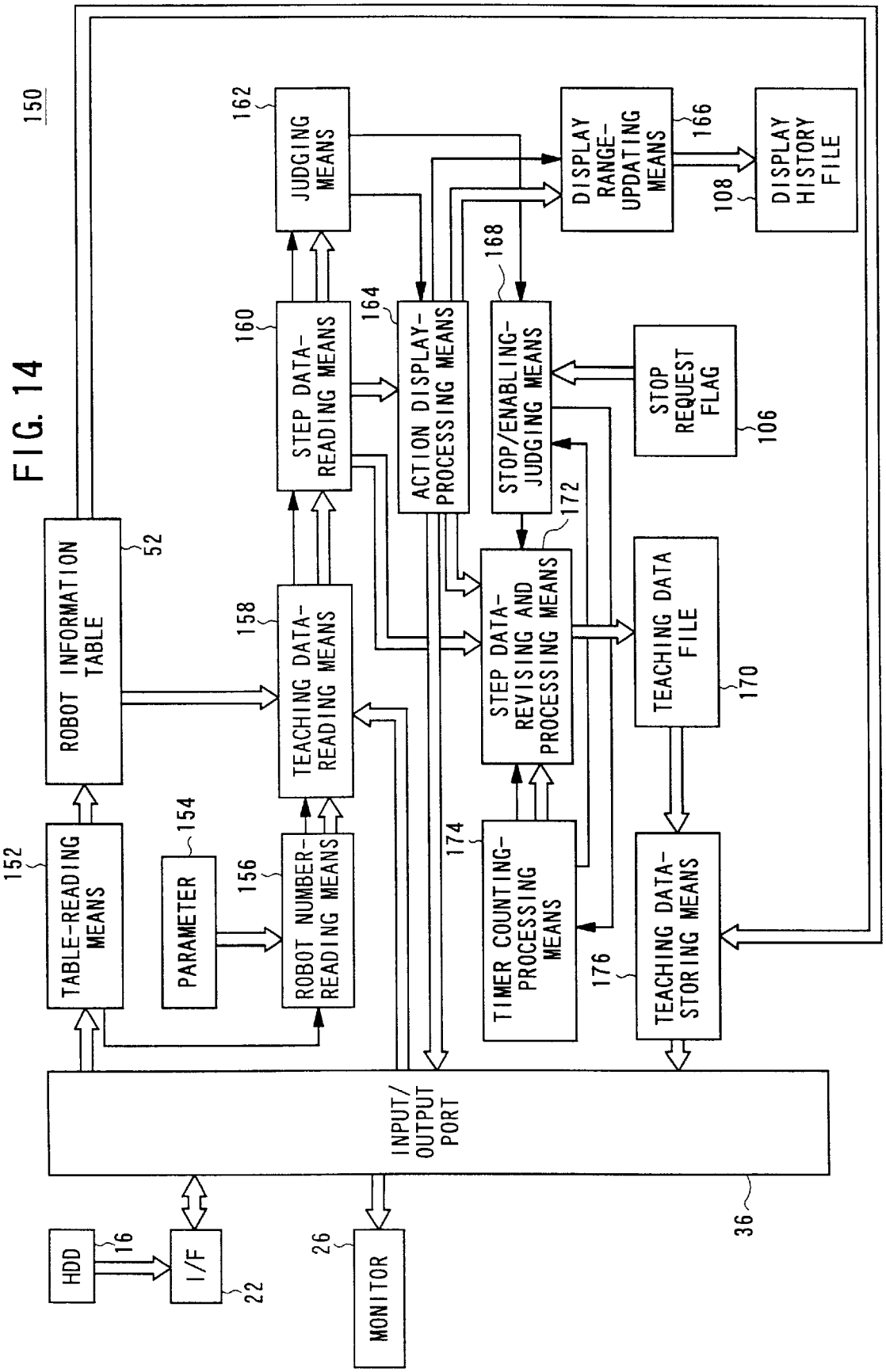
FIG. 14 shows a functional block diagram illustrating an arrangement of a simulation-processing means.

As shown in FIG. 14, the simulation-processing means 150 comprises a table-reading means 152 for reading the robot information table 52 recorded on the hard disk to store read data in a predetermined storage region on the data RAM 34, a robot number-reading means 156 for reading the robot number from the start parameter 154, a teaching data-reading means 158 for reading, from the hard disk, teaching data corresponding to the robot model indicated by the read robot number, a step data-reading means 160 for reading necessary step data from the read teaching data, a judging means for judging, for example, data end, an action display-processing means 164 for displaying action in an amount of one pulse or several pulses for the robot model toward a target pulse value of the read step data, a display range-updating means 166 for updating the display range of the concerning robot model in the display history file 108, a stop/enabling-judging means 168 for judging whether the stop request or the enabling request (indicating permission to start the action again) is given on the basis of the stop request flag 106, a step data-revising means 172 for registering, as the jth step data with a teaching data file 170, the pulse value for each axis at present recognized by the action display-processing means 164, the step data indicating the stop state, or the read step data, a timer counting means 172 for counting the time from the stop request to the enabling request on the basis of a reference clock, and a teaching data-storing means 176 for storing data in the teaching data file 170 as normal teaching data on the hard disk.

Next, the processing operation performed by the simulation-processing means 150 will be explained with reference to flow charts shown in FIGS. 15 and 16.

At first, in a step S201, the table-reading means 152 is used to read the robot information table 52 recorded on the hard disk to store read data in a predetermined storage region on the data RAM 34.

Next, in a step S202, the robot number-reading means 156 is used to read the robot number from the start parameter 154.

Next, in a step S203, the teaching data-reading means 158 is used to read the storage head address of the teaching data registered in the record corresponding to the read robot number in the robot information table 52 so that the teaching data is read from the hard disk by the aid of HDD 16 on the basis of the storage head address.

Next, in a step S204, an initial value "0" is stored in an index register i used as an index for reading the step data and in an index register j used as an index for storing data in the teaching data file to initialize the index registers i, j.

Next, in a step S205, the step data-reading means 160 is used to read the ith step data from the read teaching data.

Next, in a step S206, the judging means 162 is used to judge whether or not the read step data is EOD (end of data). If it is judged that the step data is not EOD, and there is no data end, then the routine proceeds to the next step S207. The action display-processing means 164 is used to display action in an amount of one pulse or several pulses for the robot model toward the target pulse value of the read step data.

Next, in a step S208, the display range-updating means 166 is used to update the display range of the concerning robot model in the display history file 108.

Next, in a step S209, the judging means 162 is used to judge whether or not the present pulse value for each axis recognized by the action display-processing means 164 arrives at the target pulse value (pulse value indicated by the step data).

If it is judged that the pulse value does not arrive at the target pulse value, the routine proceeds to the next step S210. The stop/enabling-judging means 168 is used to judge whether or not the stop request is given at present. This judgement is made depending on whether or not the bit of the stop request flag 106 corresponding to the robot number is "1". As described for the processing operation effected by the interlock-processing means 100, the stop request is made at the point of time at which the concerning robot model begins invasion into the interference region after another robot model has already invaded into the certain interference region.

If it is judged that the bit is "1", and the stop request is given at present, then the routine proceeds to the next step S211. The step data-revising means 172 is used to register the present pulse value for each axis recognized by the action display-processing means 164 as the jth step data with the teaching data file 170.

Next, in a step S212, the value of the index register j is updated by +1. After that, in the next step S213, the timer counting means 174 is used to start counting for the timer. The counting operation is performed by counting reference clocks outputted from a clock generator (not shown), and the operation is continued until the request for stopping counting is given.

Next, in a step S214, the stop/enabling-judging means 168 is used to judge whether or not the enabling request is given at present. This judgement is made depending on whether or not the bit of the stop request flag 106 corresponding to the robot number is "0". The step S214 is repeated until the enabling request is given. That is, the system waits for the enabling request.

The routine proceeds to the next step S215 at the point of time at which the enabling request is given to stop the timer counting effected by the timer counting means 174.

After that, in a step S216, the step data-revising means 172 is used to register the step data indicating the stop state as the jth step data with the teaching data file 170 together with the timer counting value. Owing to the process performed in the step S211 and the process performed in the step S216, the mutual interlock is reflected on the teaching data.

Next, in a step S217, the value of the index register j is updated by +1. At the stage at which the process in the step S217 is completed, or if it is judged in the step S210 that there is no stop request, the routine returns to the step S207 to repeat the process in the step S207 and the followings. That is, the concerning robot model is allowed to make display action in an amount of one pulse or several pulses from the present display state toward the target pulse value. Accordingly, the relationship between the concerning robot model and all of the interference regions is monitored by the interlock-processing means 100.

If it is judged in the step S209 that the present pulse value of each axis arrives at the predetermined target pulse value, the routine proceeds to a step S218. The step data-revising means 172 is used to register the concerning step data (ith step data) as the jth step data with the teaching data file 170.

Next, in a step S219, the value of the index register i is updated by +1. After that, the routine returns to the step S205 to repeat the process in the step S205 and the followings. That is, the next step data is read from the teaching data, and the concerning robot model is successively allowed to make action display in an amount of one pulse or several pulses from the present display state toward the target pulse value of the step data. The relationship between the concerning robot model and all of the interference regions during this process is monitored by the interlock-processing means 100.

The routine proceeds to the next step S220 at the stage at which it is judged that the data end is given in the step S206. The teaching data-storing means 176 is used to store the data in the teaching data file 170 as the normal teaching data on the hard disk by the aid of HDD 16. That is, owing to this process, the teaching data, on which the mutual interlock is reflected, is registered again as the normal teaching data.

At the stage at which the process in the step S220 is completed, the simulation-processing means 150 comes to an end.

As described above, in the off-line teaching apparatus 10 according to the embodiment of the present invention, the first function, i.e., the process performed by the application-deciding means 72 as one of the constitutive components of the display-processing means 50 is used to start the teaching application corresponding to the robot model designated by the coordinate input device 14, of the plurality of robot models RM1 to RM4 displayed on the screen of the monitor 26 to make it possible to perform the teaching based on the designated robot model.

Accordingly, the teaching application for the robot model is started by merely designating, by the operator, the robot model intended to be subjected to the teaching, of the plurality of robot models RM1 to RM4 displayed on the screen of the monitor 26, by using the coordinate input device 14. As a result, the operation for the off-line teaching becomes intuitively comprehensible. The off-line teaching system can be used even when the operator is not specially educated.

Especially, in the embodiment of the present invention, the image of the teaching box TB, which corresponds to the designated robot model, is displayed on the monitor when the teaching application is started. Therefore, the off-line teaching data can be prepared while using the image of the teaching box TB without using any actual teaching box. Thus, it is possible to reduce, for example, the production cost for the hardware.

Further, in the off-line teaching apparatus 10 according to the embodiment of the present invention, the second function, i.e., the process performed by the interference region-setting means 74 as one of the constitutive elements of the display-processing means 50 is used to define the mutual interference regions IF1 to IF3 of the action zones AZ1 to AZ3 of the plurality of designated robot models RM1 to RM3 when the plurality of robot models RM1 to RM3 are designated. Further, the process performed the interlock-processing means 100 and the simulation-processing means 150 started by the aid of the interference region-setting means 74 is used to establish the mutual interlock for the invasion of the plurality of robot models RM1 to RM3 into the interference regions IF1 to IF3. The timing of the mutual interlock is reflected on the teaching data.

In the present invention, the mutual interlock for operating the plurality of robot models RM1 to RM3 is automatically reflected on the teaching data with ease. Therefore, when the teaching data is prepared for the plurality of robot models RMo to RM3, then it is unnecessary for the operator to consider the mutual interlock, and the operability is improved corresponding thereto. Thus, the off-line teaching system can be successfully used even when the operator is not specially educated. This contributes to popularization of the off-line teaching system.

In the embodiment described above, the first and second functions are combined with each other to remarkably improve the operability of the off-line teaching. Besides, a variety of embodiments may be conceived, including, for example, an apparatus having only the first function, and an apparatus having only the second function.

It is a matter of course that the off-line teaching method and the apparatus therefor according to the present invention are not limited to the embodiment described above, which may be embodied in other various forms without deviating from the gist or essential characteristics of the present invention.

What is claimed is:

1. An off-line teaching method for producing data for controlling motion of a physical robot, comprising the steps of:

providing a plurality of teaching programs;

displaying a plurality of robot models each corresponding to a different physical robot simultaneously on a monitor, each of said robot models being operated by a different one of said teaching programs respectively;

designating one of said plurality of robot models displayed on said monitor using an input device;

displaying automatically on the monitor a teaching box corresponding to a teaching program for the designated robot model; and initiating, as a result of said designating step, a teaching application corresponding to the robot model designated by said input device.

2. The off-line teaching method according to claim 1, further comprising the step of displaying on said monitor an image of a teaching box corresponding to said designated robot model when said teaching application is initiated.

3. The off-line teaching method according to claim 1, further comprising the steps of:

designating a plurality of robot models using said input device;

defining mutual interference regions of action zones of said plurality of designated robot models;

setting up a mutual interlock routine for permitting invasion of said plurality of robot models into said interference regions; and incorporating said mutual interlock routine into timing data of said teaching data.

4. The off-line teaching method according to claim 3, wherein said mutual interlock routine comprises a stop request routine for permitting a robot model which has first invaded into an interference region to occupy said interference region only while other robot models are in a stopped state.

5. An off-line teaching method for producing data for controlling motion of a physical robot, comprising the steps of:

providing a plurality of teaching programs;

displaying a plurality of robot models each corresponding to a different physical robot simultaneously on a monitor, each of said robot models being operated by a different one of said teaching programs respectively;

designating a plurality of said robot models using said input device;

displaying automatically on the monitor teaching boxes corresponding to teaching programs for the designated robot models;

defining mutual interference regions of action zones of said plurality of designated robot models;

setting up a mutual interlock routine for permitting invasion of said plurality of robot models into said interference regions; and incorporating said mutual interlock routine into timing data of said teaching data.

6. The off-line teaching method according to claim 5, wherein said mutual interlock routine comprises a stop request routine for permitting a robot model which has first invaded into an interference region to occupy said interference region only while other robot models are in a stopped state.

7. An off-line teaching apparatus for producing data for controlling motion of a physical robot, comprising:

a plurality of teaching programs;

a monitor for simultaneously displaying a plurality of robot models each corresponding to a different physical robot thereon, each of said robot models being operated by a different one of said teaching programs respectively;

an input device for designating a robot model;

means for displaying automatically on the monitor a teaching box corresponding to a teaching program for the designated robot model; and application-initiating means for initiating a teaching application corresponding to the robot model designated by said input device, thereby making it possible to perform teaching based on the designated robot model.

8. The off-line teaching apparatus according to claim 7, further comprising a box image display means for displaying an image of a teaching box corresponding to said designated robot model on said monitor when said teaching application is initiated.

9. The off-line teaching apparatus according to claim 7, further comprising:

interference region defining means for defining mutual interference regions of action zones of a plurality of designated robot models, when a plurality of robot models are designated using said input device;

interlock processing means for setting up a mutual interlock routine for permitting invasion of said plurality of robot models into said interference regions; and wherein said mutual interlock routine is incorporated into timing data of said teaching data.

10. The off-line teaching apparatus according to claim 9, wherein said interlock processing means further comprises stop request processing means for permitting a robot model, among said plurality of robot models, which has first invaded into an interference region to occupy said interference region only while other robot models among said plurality of robot models are in a stopped state.

11. An off-line teaching apparatus for producing data for controlling motion of a physical robot, comprising:

a plurality of teaching programs;

a monitor for simultaneously displaying a plurality of robot models each corresponding to a different physical robot thereon, each of said robot models being operated by a different one of said teaching programs respectively;

an input device for designating a plurality of said robot models;

displaying automatically on the monitor teaching boxes corresponding to teaching programs for the designated robot models;

interference region defining means for defining mutual interference regions of action zones of the plurality of designated robot models;

interlock processing means for setting up a mutual interlock routine for permitting invasion of said plurality of robot models into said interference regions; and wherein said mutual interlock routine is incorporated into timing data of said teaching data.

12. The off-line teaching apparatus according to claim 11, wherein said interlock processing means further comprises stop request processing means for permitting a robot model, among said plurality of robot models, which has first invaded into an interference region to occupy said interference region only while other robot models among said plurality of robot models are in a stopped state.

* * * * *